July 7, 1964 L. L. RAKOCZI 3,140,465
PARITY CHECKER FOR ASYNCHRONOUS DATA PROCESSING SYSTEM
Filed May 31, 1961 5 Sheets-Sheet 1

INVENTOR.
LASZLO L. RAKOCZI
BY
Attorney

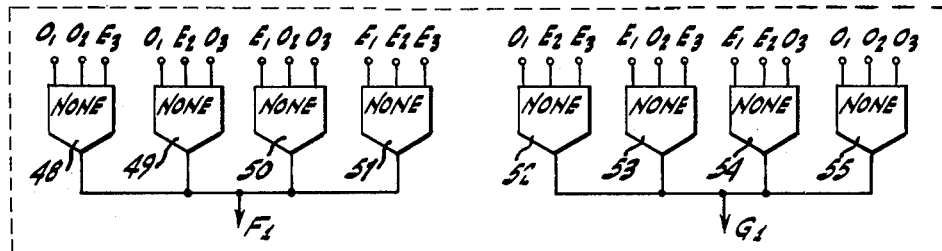
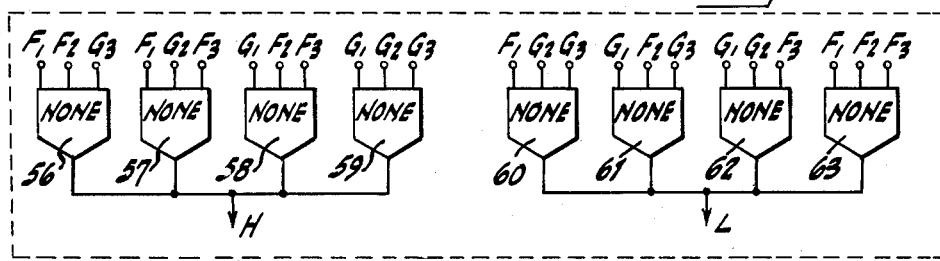
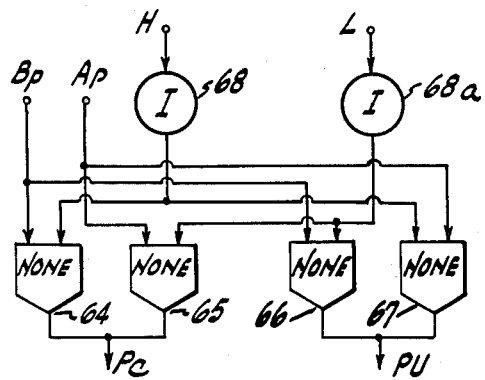
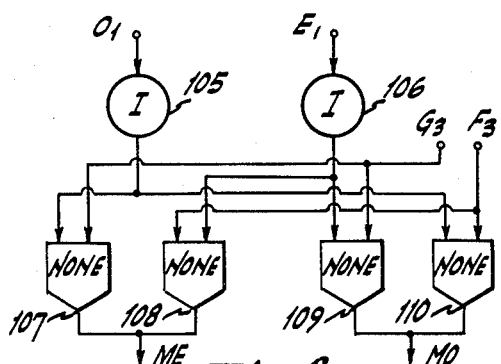
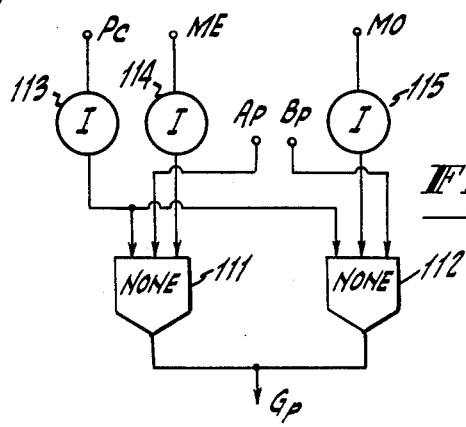

July 7, 1964 L. L. RAKOCZI 3,140,465
PARITY CHECKER FOR ASYNCHRONOUS DATA PROCESSING SYSTEM
Filed May 31, 1961 5 Sheets-Sheet 3
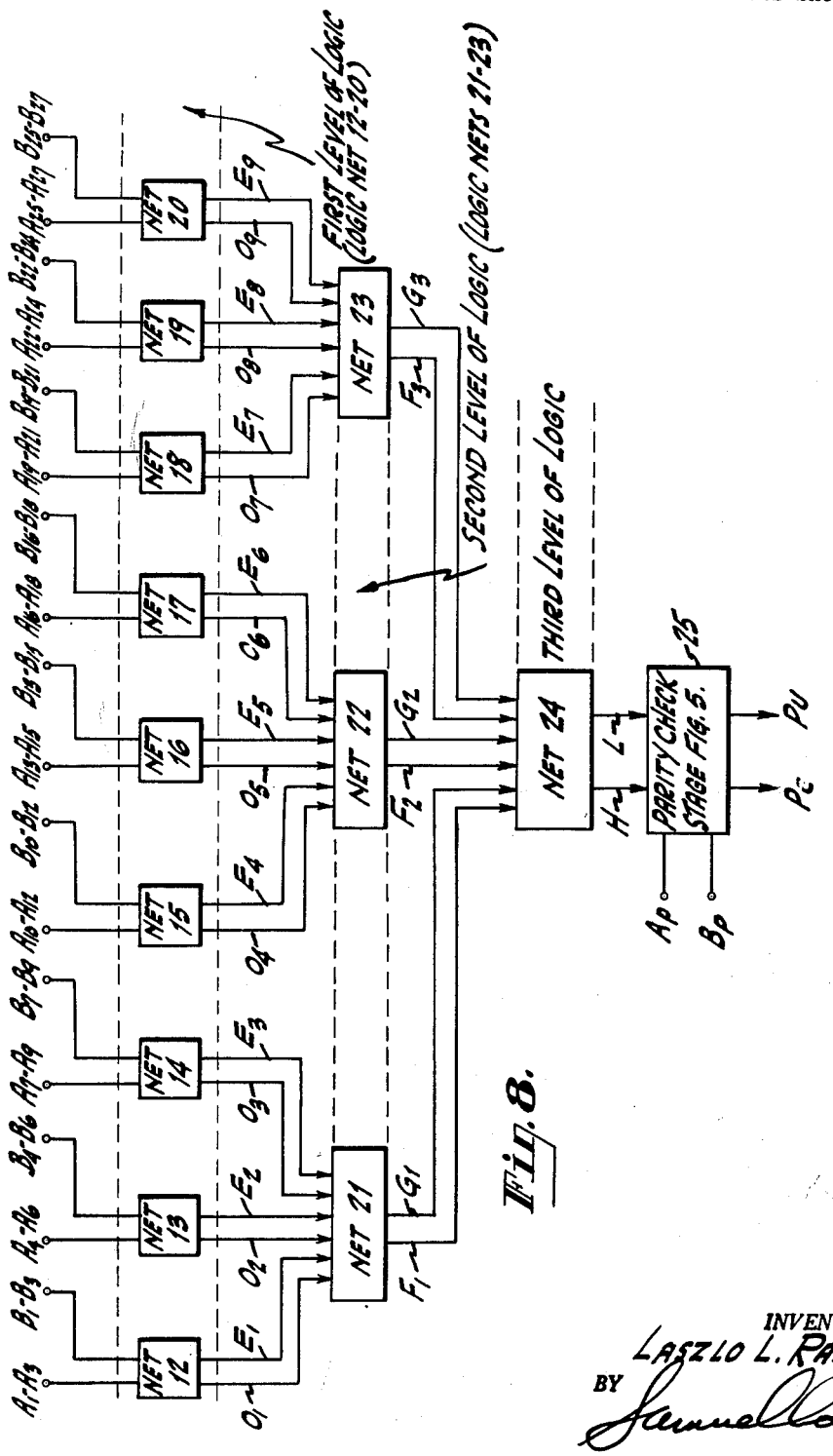

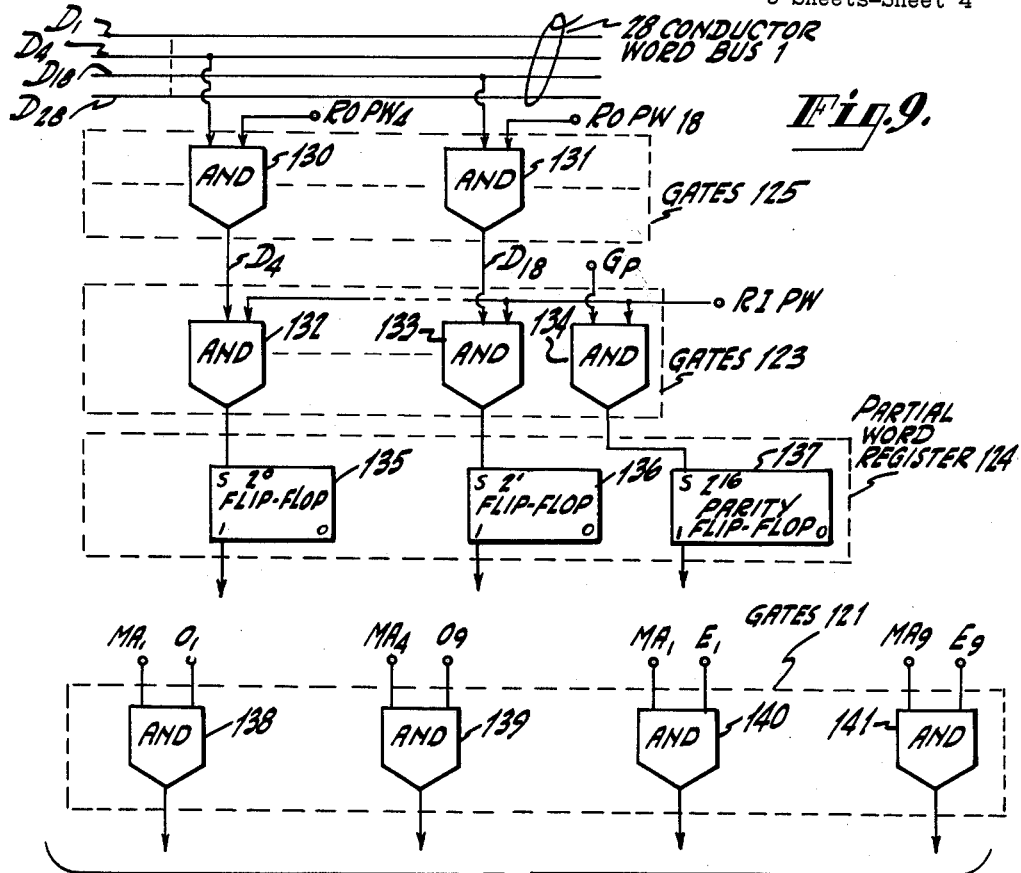
Fig. 9.
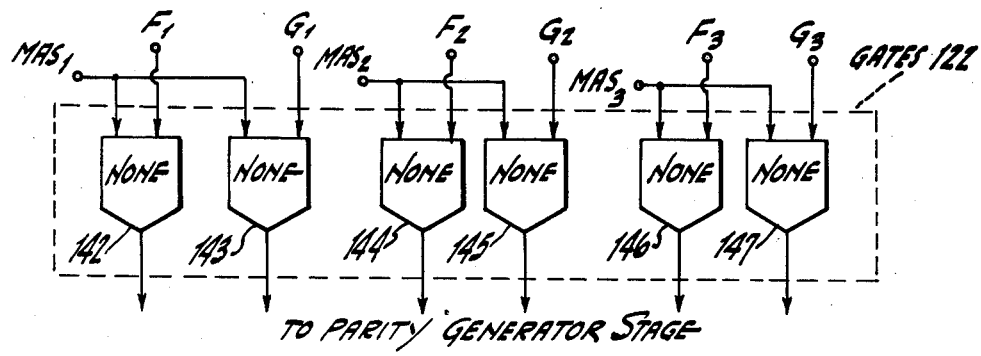
Fig. 10.
Fig. 11.
INVENTOR.
LASZLO L. RAKOCZI
BY
ATTORNEY

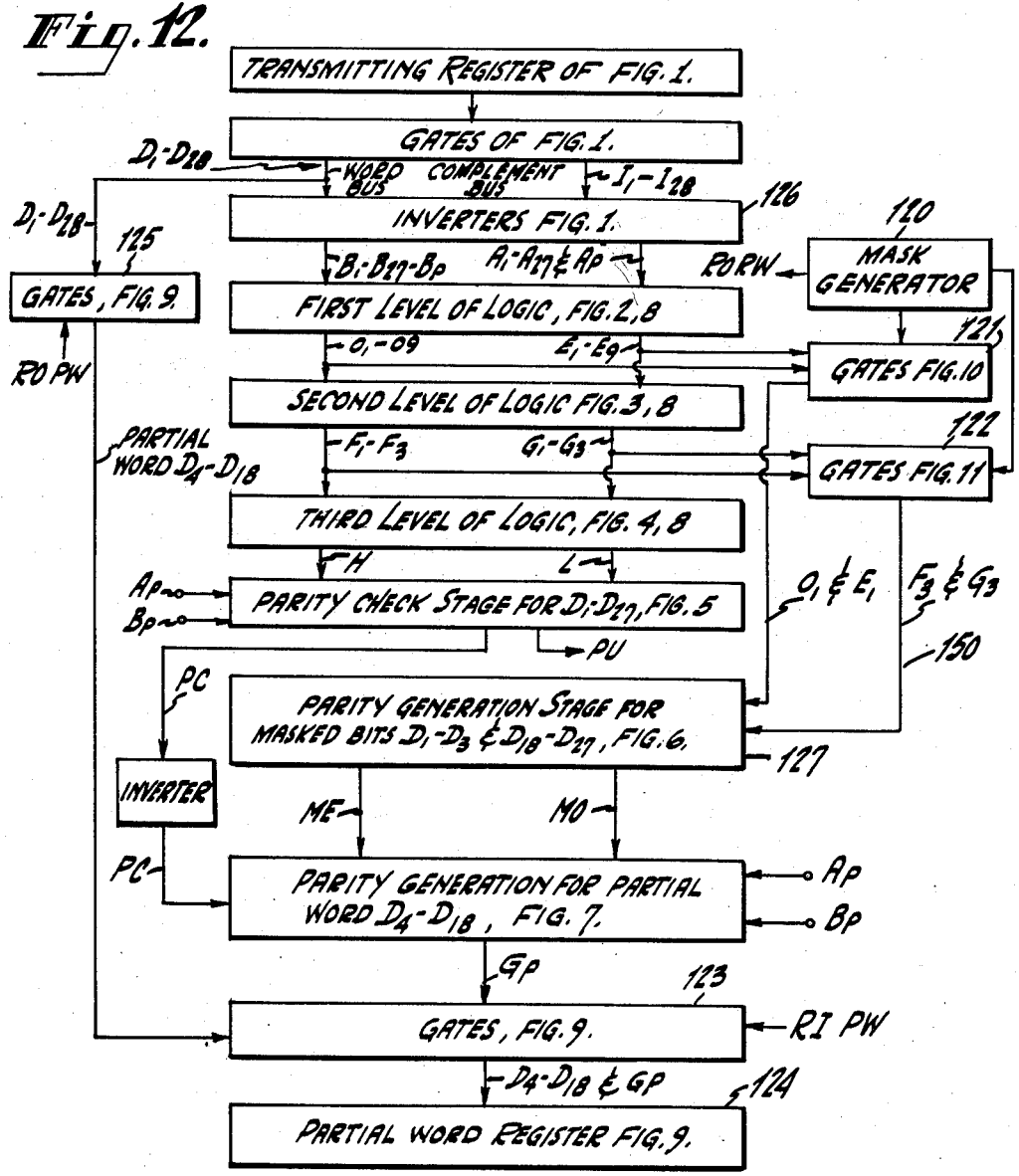

United States Patent Office 3,140,465
Patented July 7, 1964

3,140,465
PARITY CHECKER FOR ASYNCHRONOUS
DATA PROCESSING SYSTEM
Laszlo L. Rakoczi, Merchantville, N.J., assignor to Radio Corporation of America, a corporation of Delaware
Filed May 31, 1961, Ser. No. 113,692
11 Claims. (Cl. 340—146.1)

The present invention relates to a data processing system and, more particularly, to new and improved parity checking, parity generating and masking techniques for digital computers.

Brief Description of Problem

A digital computer may include numbers of parity check circuits and parity generator circuits. For example, there is normally a separate parity check circuit associated with the various transmitting units in the computer. Similarly, there is normally a parity generator circuit located at the many places in a computer where the parity of a word operated on may be changed.

Parity generator and parity checking circuits are relatively expensive. In one known computer, for example, there are from 8 to 16 parity generators, depending on the number of arithmetic units and buffer units supplied with the computer. Each such generator includes some 148 transistors. In the same computer there are from 6 to 10 parity checkers, depending upon the number of memory units and important receiving registers. Each high speed asynchronous checker requires 152 transistors. Accordingly, the requirement for a large number of parity checkers and parity generators for a computer substantially increases the expense of the computer. Further, in known computers the check of parity and the generation of parity consume considerable time.

One object of the present invention is to reduce the number of parity generators and checkers required in computers and thereby to reduce the cost of the computer.

Another object of the present invention is to provide parity check and parity generation circuits which can operate at relatively high speeds.

Another object of the invention is to provide an improved circuit which is capable of checking and generating the parity of words made up of asynchronously occurring binary bits. The term "asynchronous," as used here, refers to the occurrence of binary bits making up a word during time intervals which are not fixed with respect to one another. The differences in occurrence times may be due, for example, to different delays inserted by different stages in the computer through which the different bits of information pass.

Another object of the invention is to provide a circuit which can check and generate the parity of a word at high operating speeds.

Another object of the invention is to provide a parity circuit which can concurrently check the parity of a word, and generate parity for part of the word.

Another object of the invention is to provide a parity circuit which continues to operate correctly even though the stages making up the circuit change the delays they introduce with time or other changing circuit parameters.

Another object of the invention is to provide a parity circuit which can employ relatively cheap circuit elements such as cheap transistors, which vary relatively widely element-to-element in parameters such as time delay.

A problem associated with the generation of parity is masking. Masking is one technique which is employed when it is desired to separate a word in a computer into two or more partial words, each with a lesser number of binary bits than the entire word. One or both of the partial words may require the generation of a parity bit prior to further use of a partial word.

Masking is often done in digital computers in the arithmetic unit of the computer. The masking is a synchronous operation and in this sense is performed in the "worst case" time rather than in the average time. Moreover, the time during which the masking is performed is "extra" computer time in the sense that no other operations are performed during the masking.

An object of this invention is to provide a new and improved masking technique which requires considerably less time and equipment than the prior art technique described briefly above.

Another object of the invention is to provide a parity circuit which checks the parity of a word, masks a portion of the word, and generates parity for the remainder of the word—all during the time the word is being transmitted between circuits in a computer.

Brief Description of Invention

According to the invention, the parity of a word is checked and, concurrently, a portion of the word is masked and parity is generated for the remainder of the word. The generation of parity for this remainder of the word may be accomplished by comparing the parity bit of the full word with the number of "ones" in the binary bits of the masked portion of the word. If, for example, this parity bit is "one" (indicating in an odd parity system an even number of "ones" in the full word) and there are an even number of "ones" in the masked portion of the word, the system indicates that there are an even number of "ones" in the remainder of the word.

The system of the invention includes a circuit for examining the binary bits in a word and complements of these bits a group at a time to thereby derive a fewer number of bits and their complements, each indicative of an odd or even number of "ones" in a group of bits examined. The fewer number of bits are subsequently examined in the same manner to obtain a still fewer number of bits and their complements. The process is continued until a single bit and its complement is derived which indicates an odd or even number of "ones" in the word. These may be compared with the parity bit and its complement to determine whether the parity of the word is correct.

The part of the word it is desired to mask is obtained from the parity check portion of the circuit just described during the parity check process. This part of the word may be, for example, one or more of the groups of bits examined. The binary bits derived in the checker for these groups indicate already the number of "ones" in the masked word and may be employed directly in the stages of logic which follow which generate the parity of the remainder of the word.

The parity checking, parity generating and masking are performed in asychronous fashion during the transmission of a word or partial word between two circuits in the computer. As contrasted to the prior art, in which large numbers of parity checkers and generators are required, a single combined parity checker-generator may be employed for the entire computer. In the case of a computer in which each word has a much greater number of digits, or in which it is desired simultaneously to generate parity for two parts of a full word, two combined checker-generators may be employed for the entire computer.

Brief Description of Drawings

FIGS. 2–4 are block diagrams of circuits in various levels of logic of the parity circuit of the invention;

FIG. 5 is a block circuit diagram of the portion of the parity circuit which generates a binary bit to indicate whether the parity of the word checked is correct or not;

FIG. 6 is a block circuit diagram of a part of the parity circuit for generating parity for a masked word;

FIG. 7 is a block circuit diagram of a part of the parity circuit for generating parity for the unmasked portion of a word;

FIG. 8 is a block circuit diagram of the complete parity check circuit portion of the invention;

FIG. 9 is a block circuit diagram of a partial word register and certain gates leading to the register;

FIGS. 10 and 11 are block circuit diagrams of gates at which masking is performed; and FIG. 12 is a block circuit diagram of the complete parity generator, parity checker, masking circuit.

General

Figure 1:
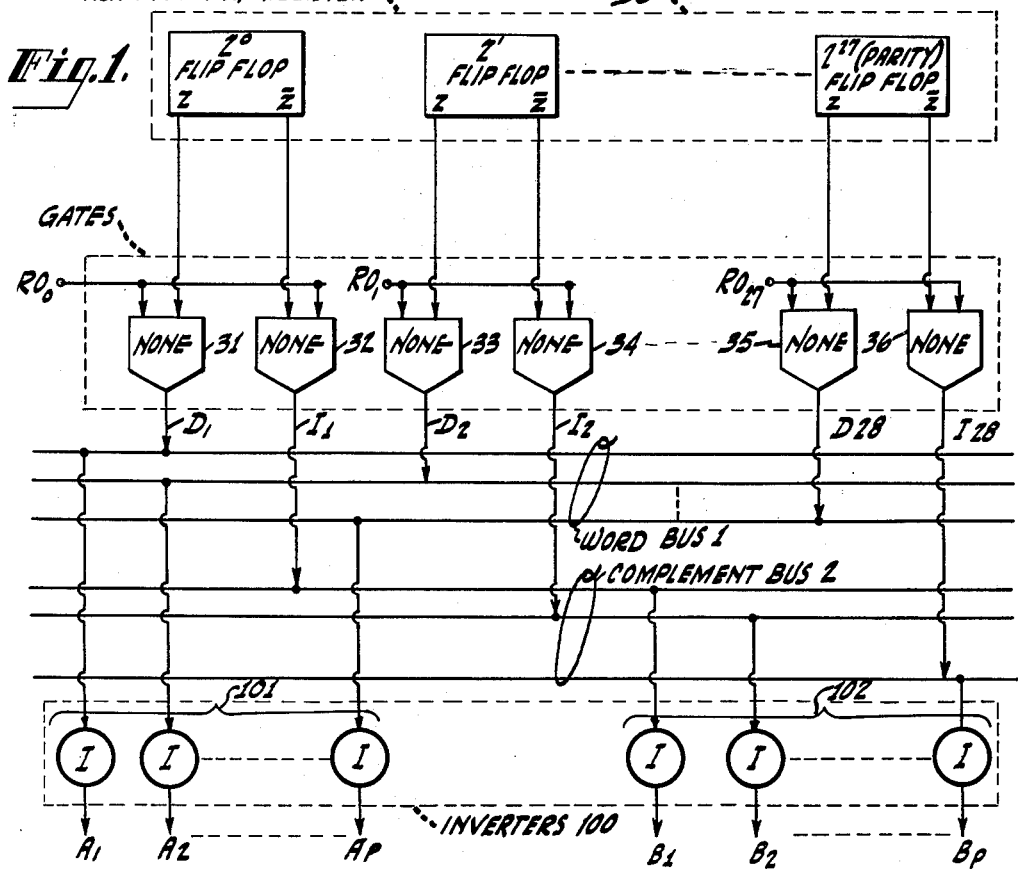
FIG. 1 is a block circuit diagram of a portion of a digital computer showing a register, gates, inverters, and buses which carry information bits.

A number of the blocks shown in the figures above are in themselves known circuits. The circuits of the blocks are actuated by electrical signals applied to the blocks. When a signal is at one level, it represents the binary digit "one" and when it is at another level, it represents the binary digit "zero." For the sake of the discussion which follows, it may be assumed that a high level signal represents the binary digit "one" and the low level signal, say zero volts, the binary digit "zero." Also, to simplify the discussion, rather than speaking of an electrical signal being applied to a block or logic stage, it is sometimes stated that a "one" or a "zero" is applied to the block or stage.

Throughout the figures, capital letters are used to represent the signals indicative of binary digits. For example, $D_1$ may represent the binary digit "one" or the binary digit "zero." In some cases, a capital letter with a bar over it represents the complement of a binary digit. In some cases, capital letters are employed in Boolean equations as a convenient means for succinctly describing a circuit operation.

In some cases, combinations of capital letters are used in the description to identify leads and signals. For example, $RO_0$ is a control signal which enables certain "none" gates when the control signal represents the binary digit "zero." Other combinations of letters are identified in the application as they arise.

Throughout the figures a logic circuit known as a multiple input "none" gate is used. A "none" gate produces a "one" output when all of the inputs to the gate are "zero" and a "zero" output when one or more of the inputs are "one." This gate may consist of an "and" gate which has an inverter in series with each of its input leads. Alternatively, a "none" gate may consist of an "or" gate followed by an inverter. Regardless of the way in which the gate is implemented, its Boolean equation in the case in which there are two inputs A and B and one output C is $\overline{AB}=C$ or $\overline{A+B}=C$ and the truth table for the gate is:

| A | B | C |
|---|---|---|
| 0 | 0 | 1 |
| 0 | 1 | 0 |
| 1 | 0 | 0 |
| 1 | 1 | 0 |

Definitions

A "word" is an ordered set of bits and is the normal unit in which information is stored, transmitted or otherwise operated on in a computer. In the computer of which the present invention is a part, a full word is 56 bits long and a half word 28 bits long. For purposes of simplifying the discussion which follows, only 28 bits are dealt with and accordingly the 28 bits are termed a "word." The 28 bit word may be subdivided into nine three-bit characters, sometimes known as "octal" characters, and a parity bit.

In the computer discussed in detail below, a word is transmitted on one bus and the complement of the word is transmitted on another bus. The convention is adopted that the word consists of a group D digits and the complement of the word, a group of I digits. Further, when information is present, the word made up of D digits is equal to a word made up of B digits.

Parity check is a method of checking errors in a word or character. The check makes use of a self-checking code in which the total number of "ones" or "zeros" is always even or odd, according to the convention adopted. The parity bit in a word is initially made either a "one" or a "zero" to insure, for example, that the total number of "ones" in the word is odd. If the word is later checked and found to have an odd number of "ones," the parity is correct and it is assumed that there are no errors. The circuit which generates the parity bit is known as a parity generator.

Transmitting Registers and Associated Circuits

A small part of a digital computer with which the parity circuit of the present invention may be used is shown in FIG. 1. The computer has two 28-conductor cables hereafter termed "word bus 1" and "complement bus 2." Twenty-seven wires of bus 1 are for transmitting information bits $D_1-D_{27}$ (the 27 information bits which form a word in this computer), respectively, and the 28th wire of bus 1 is for transmitting a parity bit $D_{28}$. In like manner, 27 wires of bus 2 are for transmitting information bits $I_1-I_{27}$, the 28th wire is for transmitting the parity bit $I_{28}$. The I bits are complementary to the D bits, when data is present.

A large number of registers may be connected to the wires of the two buses. Each of the registers includes 28 flip-flops, one for each wire of each bus. To simplify the system for the purposes of the present discussion, only one of these registers, illustrated by dashed block 30, is shown. Also, to simplify the discussion, only three of the 28 flip-flops in the register are shown. These are legended the $2^0$ flip-flop, the $2^1$ flip-flop, and $2^{27}$ parity flip-flop. Each flip-flop has a first output Z and a second output $\overline{Z}$. In other words, when output Z represents the binary digit "one," output $\overline{Z}$ represents the binary digit "zero" and vice versa.

The Z output of the $2^0$ flip-flop is connected through "none" gate 31 to wire 1 of bus 1. The $\overline{Z}$ output of the $2^0$ flip-flop is connected through "none" gate 32 to wire 1 of bus 2. In like manner, the Z and $\overline{Z}$ outputs of the $2^1$ flip-flop are connected through "none" gates 33 and 34 to wire 2 of buses 1 and 2, respectively, the Z and $\overline{Z}$ outputs of the $2^2$ flip-flop (not shown) are connected through "none" gates (not shown) to wire 3 (not shown) of buses 1 and 2, respectively, and so on, and the Z and $\overline{Z}$ outputs of flip-flop $2^{27}$ are connected through "none" gates 35 and 36 to wire 28 of buses 1 and 2, respectively.

"None" gates 31–36 are multiple input "none" gates. The first input has already been described. The second input is a binary digit RO (Read-out Command) which arrives from the machine instruction generator of the central control unit of the computer. The machine instruction generator is a well-known unit and is discussed, for example, in Digital Computer and Control Circuits by Ledley, McGraw-Hill, 1960, chapter 17, where it is termed an "operations signal generator." The binary digit RO is normally a "one" so that "none" gates 31–36 are normally inactivated. When it is desired that a "none" gate be placed in condition to conduct, RO is changed from "one" to "zero." It may be assumed for the purposes of the present discussion that the RO digits occur asynchronously, that is, they may arrive at the "none" gates 31–36 during different time intervals. This may be due to different delays imparted by the stages through which the RO voltages pass and the different delays in turn may be due to different times required by the different stages to perform their logic functions or to different inherent delays in the elements making up the logic stages.

The circuit of FIG. 1 operates as follows. Each RO is normally "one" so that "none" gates 31–36 are normally cut off. This means that the outputs of the "none" gates, that is, $D_1$–$D_{28}$ and $I_1$–$I_{28}$ are "zero." When it is desired to transfer the information from the register to the wires of the two buses, $RO_0$–$RO_{27}$ are changed from "one" to "zero." If the Z output of the $2^0$ flip-flop is "zero" and the $\overline{Z}$ output "one," then "none" gate 31 conducts and "none" gate 32 remains cut-off. This means that $D_1=1$ and $I_1=0$. Similarly, one of "none" gates 33 or 34 will conduct so that $D_2$ will be one binary digit and $I_2$ its complement and so on. In other words, in the general case, $D_x=\overline{I}_x=1$ or $\overline{D}_x=I_x=1$ when information is present; $D_x=I_x=0$ when information is absent; the situation in which $D_x=I_x=1$ is not possible. $D_x=\overline{I}_x=1$ indicates the presence of the binary digit 1; $\overline{D}_x=I_x=1$ indicates the presence of the binary digit 0.

A total of 56 inverters are connected to the word and complement buses. These are within block 100 and each is shown by an "I" within a circle. Twenty-eight inverters are for the word bus and 28 for the complement bus.

The output of the first group 101 of inverters is the binary word $A_1$ through $A_{27}$ plus $A_p$, the parity bit. The output of the second group 102 of inverters is the binary word $B_1$–$B_{27}$ plus the parity bit $B_p$. The A and B words are applied to the parity circuit described in more detail below.

When information is present on the word bus and the complement bus, the A and B words are complementary and the D word is equal to the B word; when no information is present on the word and complement bus, all bits of the A word equal the corresponding bits of the B word equal "one."

First Level of Logic in Parity Circuit

Figure 2:
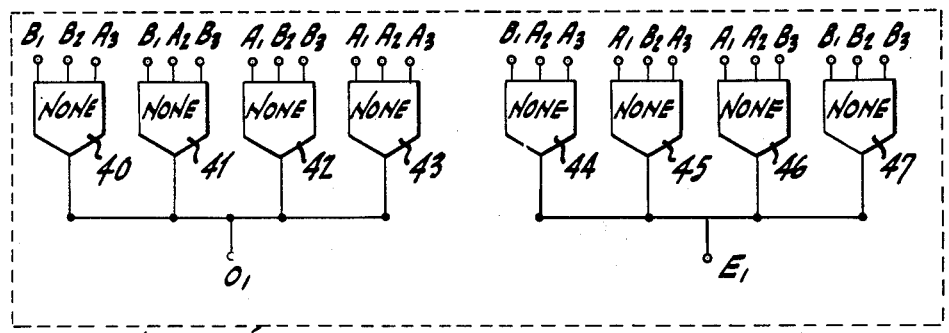

A circuit illustrative of those circuits in the first level of logic in the parity circuit (FIGS. 8 and 12) is shown in FIG. 2 and legended "Logic Net 12." Logic nets 13–20 of the first level are identical in structure to net 12 but have different binary input bits applied and different outputs. For example, logic net 13 has the binary digits $A_4$, $A_5$ and $A_6$ and $B_4$, $B_5$ and $B_6$ applied, and outputs $O_2$ and $E_2$. Logic net 14 has the bits $A_7$, $A_8$ and $A_9$ and $B_7$, $B_8$ and $B_9$ applied, and so on. This is shown more clearly in FIG. 8 which is discussed in detail later.

The purpose of logic net 12 is to examine the first three bits $B_1$–$B_3$, respectively, and to produce an output which indicates whether there are an odd or an even number of "ones." When there are an odd number of "ones" in the three B bits, then, as will be shown below, O becomes "one" and E remains "zero" and when there are an even number of "ones," then O remains "zero" and E becomes "one."

Logic net 12 includes eight "none" gates 40–47. The first four gates have their outputs connected together and the second four their outputs connected together. Each gate has various combinations of A and B inputs taken three at a time. It may be seen by inspection that if $A_1$ or $A_2$ or $A_3$ information is not present, all of the "none" gates 40–47 remain cut-off. For example, when $A_1$ information is not present, then $A_1=1$ and $B_1=1$, as explained above. Since either $A_1$ or $B_1$ is an input to each and every "none" gate, all "none" gates in net 12 are inactivated. This means that $O_1$ and $E_1$ remain "zero." If the $A_1$ and $A_2$ and $A_3$ information is present, then $B_1$, $B_2$ and $B_3$ are complements of $A_1$, $A_2$ and $A_3$, respectively, and one of gates 41–47 conducts. It follows that the information $A_1$–$A_3$ may arrive at logic nets 3–11 in asynchronous fashion and this will in no sense affect the operation of logic nets 12–20. The latter wait until the information has arrived at logic nets 3–11 and then one gate in each net is enabled. Since the A and B information may occur asynchronously, the logic nets 12–20 operate in asynchronous fashion. Each begins to operate as soon as all bits of an octal character (such as $A_1$, $A_2$ and $A_3$) destined for the net arrives.

The operation of logic nets 12–20 is described by the following Boolean equations, using logic net 12 as an example and then deriving the general expression.

$$O_1 = U + V + W + X \quad (1)$$

Substituting A's and B's for U–X gives $$O_1 = \overline{B}_1 \cdot \overline{B}_2 \cdot \overline{A}_3 + \overline{B}_1 \cdot \overline{A}_2 \cdot \overline{B}_3 + \overline{A}_1 \cdot \overline{B}_2 \cdot \overline{B}_3 + \overline{A}_1 \cdot \overline{A}_2 \cdot \overline{A}_3 \quad (2)$$

In like manner $$E_1 = \overline{B}_1 \cdot \overline{A}_2 \cdot \overline{A}_3 + \overline{A}_1 \cdot \overline{B}_2 \cdot \overline{A}_3 + \overline{A}_1 \cdot \overline{A}_2 \cdot \overline{B}_3 + \overline{B}_1 \cdot \overline{B}_2 \cdot \overline{B}_3 \quad (3)$$

It may easily be shown that in the general case $$O_n = \overline{B}_{(3n-2)} \cdot \overline{B}_{(3n-1)} \cdot \overline{A}_{3n} + \overline{B}_{(3n-2)} \cdot \overline{A}_{(3n-1)} \cdot \overline{B}_{3n}$$
$$+ \overline{A}_{(3n-2)} \cdot \overline{B}_{(3n-1)} \cdot \overline{B}_{3n} + \overline{A}_{(3n-2)} \cdot \overline{A}_{(3n-1)} \cdot \overline{A}_{3n} \quad (4)$$

$$E_n = B_{(3n-2)} \cdot A_{(3n-1)} \cdot A_{3n} + A_{(3n-2)} \cdot B_{(3n-2)} \cdot A_n$$
$$+ A_{(3n-2)} \cdot A_{(3n-1)} \cdot B_{3n} + B_{(3n-2)} \cdot B_{(3n-1)} \cdot B_{3n} \quad (5)$$

where $n$ is an integer from one to nine. $n = N - 11$, where N refers to the logic net from which the O and E terms are derived.

Simply stated, the above equations say that when the three bits of A information and three bits of B information to be examined are present, $O = 1$ and $E = 0$ when there are an odd number of "ones" in the three B input bits, and $O = 0$ and $E = 1$ when there are an even number of "ones" in the three B input bits. The truth table for a logic net 12, as an example, is as follows:

| $A_1$ | $A_2$ | $A_3$ | $B_1$ | $B_2$ | $B_3$ | $O_1$ | $E_1$ | Number of "ones" in B's | Conducting Gate |
|---|---|---|---|---|---|---|---|---|---|
| 0 | 0 | 0 | 1 | 1 | 1 | 1 | 0 | Odd | 43 |
| 0 | 0 | 1 | 1 | 1 | 0 | 0 | 1 | Even | 46 |
| 0 | 1 | 0 | 1 | 0 | 1 | 0 | 1 | Even | 45 |
| 0 | 1 | 1 | 1 | 0 | 0 | 1 | 0 | Odd | 42 |
| 1 | 0 | 0 | 0 | 1 | 1 | 0 | 1 | Even | 44 |
| 1 | 0 | 1 | 0 | 1 | 0 | 1 | 0 | Odd | 41 |
| 1 | 1 | 0 | 0 | 0 | 1 | 1 | 0 | Odd | 40 |
| 1 | 1 | 1 | 0 | 0 | 0 | 0 | 1 | Even | 47 |

Second Level of Logic

FIG. 3 shows one of the logic nets in the second level of logic (FIG. 12) of the parity circuit. It is legended "Logic Net 21" in FIG. 3 and includes eight "none" gates 48–55. Logic nets 22 and 23 (FIG. 8) are identical in structure with logic net 21 but have different inputs and outputs. For example, the inputs to logic net 22 are $O_4$, $O_5$, $O_6$ and $E_4$, $E_5$, $E_6$ and outputs $F_2$ and $G_2$ and the inputs to logic net 23 are $O_7$, $O_8$, $O_9$ and $E_7$, $E_8$, $E_9$ and outputs $F_3$ and $G_3$. The purpose of these logic nets is to examine the O and E bits three at a time and to determine whether there are an odd or even number of "ones" in the nine D bits represented by the three O and E bits. When of the three O inputs to a logic net the number of "ones" is odd, then F remains "one" and G becomes "zero"; when of the three 0 inputs to the net the number of "ones" is even, then F becomes "zero" and G remains "one." It can also be shown that when one of the three input bits is absent as, for example, when $O_1$ and $E_1$ both equal "zero," then the combinations of the remaining two bits such as $O_2$, $O_3$ and $E_2$, $E_3$ are such that $F_1$ and $G_1$ both equal "one."

The operation of the circuit of FIG. 3 is quite similar to that of the one of FIG. 2. The Boolean expressions defining this operation for net 21 are:

$$F_1 = \overline{O}_1 \cdot \overline{O}_2 \cdot \overline{E}_3 + \overline{O}_1 \cdot \overline{E}_2 \cdot \overline{O}_3 + \overline{E}_1 \cdot \overline{O}_2 \cdot \overline{O}_3 + \overline{E}_1 \cdot \overline{E}_2 \cdot \overline{E}_3 \quad (6)$$

$$G_1 = \overline{O}_1 \cdot \overline{E}_2 \cdot \overline{E}_3 + \overline{E}_1 \cdot \overline{O}_2 \cdot \overline{E}_3 + \overline{E}_1 \cdot \overline{E}_2 \cdot \overline{O}_3 + \overline{O}_1 \cdot \overline{O}_2 \cdot \overline{O}_3 \quad (7)$$

The general expression is not given but can easily be worked out as is shown in Equations 4 and 5 above.

The truth table for logic net 21 as an example of nets 21–23 is as follows:

| $O_1$ | $O_2$ | $O_3$ | $E_1$ | $E_2$ | $E_3$ | $F_1$ | $G_1$ | Number of "ones" in O Digits | "None" Gate Conducting |
|---|---|---|---|---|---|---|---|---|---|
| 0 | 0 | 0 | 1 | 1 | 1 | 0 | 1 | Even | 55 |
| 0 | 0 | 1 | 1 | 1 | 0 | 1 | 0 | Odd | 48 |
| 0 | 1 | 0 | 1 | 0 | 1 | 1 | 0 | Odd | 49 |
| 0 | 1 | 1 | 1 | 0 | 0 | 0 | 1 | Even | 52 |
| 1 | 0 | 0 | 0 | 1 | 1 | 1 | 0 | Odd | 50 |
| 1 | 0 | 1 | 0 | 1 | 0 | 0 | 1 | Even | 53 |
| 1 | 1 | 0 | 0 | 0 | 1 | 0 | 1 | Even | 54 |
| 1 | 1 | 1 | 0 | 0 | 0 | 1 | 0 | Odd | 51 |

Third Level of Logic

After the operations performed by logic nets 21–23 are completed, there remain two groups of three binary digits $F_1$, $F_2$, $F_3$ and $G_1$, $G_2$, $G_3$ (FIG. 8). The purpose of the circuit 24 of FIG. 4 is to examine these three digits and to indicate whether there are an odd or an even number of "one" digits in each group. The circuit of FIG. 4 is identical to the one of FIG. 3. It includes eight "none" gates 56–63, respectively, connected in groups of four. Each "none" gate receives different combinations of F and G inputs. The first four "none" gates produce an H output and the second four an L output.

The Boolean expressions describing the operation of logic net 24 are:

$$H = \bar{F}_1 \cdot \bar{F}_2 \cdot \bar{G}_3 + \bar{F}_1 \cdot \bar{G}_2 \cdot \bar{F}_3 + \bar{G}_1 \cdot \bar{F}_2 \cdot \bar{F}_3 + \bar{G}_1 \cdot \bar{G}_2 \cdot \bar{G}_3 \quad (8)$$

$$L = \bar{F}_1 \cdot \bar{G}_2 \cdot \bar{G}_3 + \bar{G}_1 \cdot \bar{F}_2 \cdot \bar{G}_3 + \bar{G}_1 \cdot \bar{G}_2 \cdot \bar{F}_3 + \bar{F}_1 \cdot \bar{F}_2 \cdot \bar{F}_3 \quad (9)$$

The truth table for logic net 24 is:

| $F_1$ | $F_2$ | $F_3$ | $G_1$ | $G_2$ | $G_3$ | H | L | Number of "ones" in $F_1$ Digits | "None" Gate Conducting |
|---|---|---|---|---|---|---|---|---|---|
| 0 | 0 | 0 | 1 | 1 | 1 | 0 | 1 | Even | 63 |
| 0 | 0 | 1 | 1 | 1 | 0 | 1 | 0 | Odd | 56 |
| 0 | 1 | 0 | 1 | 0 | 1 | 1 | 0 | Odd | 57 |
| 0 | 1 | 1 | 1 | 0 | 0 | 0 | 1 | Even | 60 |
| 1 | 0 | 0 | 0 | 1 | 1 | 1 | 0 | Odd | 58 |
| 1 | 0 | 1 | 0 | 1 | 0 | 0 | 1 | Even | 61 |
| 1 | 1 | 0 | 0 | 0 | 1 | 0 | 1 | Even | 62 |
| 1 | 1 | 1 | 0 | 0 | 0 | 1 | 0 | Odd | 59 |

From the equations and truth table above, it is clear that when there are an even number of "ones" in the three F inputs, then L becomes "one" and H remains "zero" and when there are an odd number of "ones" in the three F inputs, then L remains "zero" and H becomes "one." Thus, the 27 bits originally examined have been reduced to a single bit. It can be shown that when these 27 bits are examined three at a time and the resulting nine bits examined three at a time and the resulting three bits examined three at a time, as has been done, the final binary bit L which results is "one" when the 27 transmitted D bits have an even number of "ones," and the final output L bit is "zero" when 27 transmitted D bits have an odd number of "ones."

Parity Check Stage

The parity check stage of the parity system is shown in FIG. 5. It includes two inverters 68 and 68A which receive the H and L bits respectively from stage 24 which was just discussed. Inverter 68 supplies its output to "none" gates 64 and 67 and inverter 68a applies its output to "none" gates 65 and 66. The parity bit $B_p$ is applied to "none" gates 64 and 66 and the parity bit $A_p$ is applied to "none" gates 65 and 67. When parity is correct, an output $PC=1$ is produced by the circuit and when parity is incorrect, an output $PU=1$ is produced by the circuit.

When the number of "ones" in the 27 data bits of the D word is odd, the parity bit $D_{28}$ should equal "zero" (Also, $B_p=0$). Similarly, when the 27 data bits of the D word have an even number of "ones," the parity bit $D_{28}$ should be "one" (also, $B_p=1$). It has already been mentioned that when there are an odd number of "ones" in the D word, $H=1$ and $L=0$, and when there are an even number of "ones" in the D word, $H=0$ and $L=1$.

The operation of the circuit of FIG. 5 is succinctly described in the table below. This table shows that the circuit operates as required. When the parity of the word is correct, $PC=1$ (and $PU=0$) and when the parity of the word is incorrect, $PU=1$.

| Number of "ones" in B word | H | L | $B_p$ | $A_p$ | Parity | Conducting Gate | Output |
|---|---|---|---|---|---|---|---|
| Odd | 1 | 0 | 0 | 1 | Correct | 64 | $PC=1$ |
| Even | 0 | 1 | 1 | 0 | do | 65 | $PC=1$ |
| Odd | 1 | 0 | 1 | 0 | Incorrect | 67 | $PU=1$ |
| Even | 0 | 1 | 0 | 1 | do | 66 | $PU=1$ |

The PU and PC indications may be employed to sense a missing bit or wrong parity. If, after starting a data transmission, both PC and PU remain "zero," for a long time, say five times the longest data transmission time, it is assumed that a bit is missing. In this case an alarm indicator (not shown) is actuated. Thereafter, the computer may be automatically stopped, or the computer may automatically repeat the previous instruction, or the computer may automatically start a diagnostic routine to determine the source of the error. The same types of procedures may be followed in response to a signal $PU=1$, indicating incorrect parity.

The circuit for sensing $PU=PC=0$ may include a delay line to which one of the $RO=0$ signals (FIG. 1) is applied, and a coincidence "none" gate which receives as its three inputs the delay line output and the PU and PC signals. The delay line, in this case, introduces five times the longest expected transmission delay discussed above.

The circuit for sensing $PU=1$ may simply be an amplifier connected to receive the $PU=1$ signal and supplying its output to the alarm indicator.

The alarm indicator itself and the various computer routines discussed are conventional and are not, per se, part of the invention. Accordingly, they need not be discussed further.

Parity Generation for Masked Word

The circuits which have been discussed up to now taken together constitute a system for checking the parity of a 28 bit word. When the parity of the word is correct, the circuit of FIG. 5 generates an output $PC=1$. The circuit of FIG. 6 is a portion of the parity circuit which generates parity for part of this 28 bit word.

In the present example, it is assumed that it is desired to mask the data bits $D_1$–$D_3$ and $D_{19}$–$D_{26}$ and to send the remainder of the word, namely $D_4$–$D_{18}$ to a storage register to be discussed later. It is necessary in the system under consideration to generate the correct parity for this remainder of the word. This is done in the present circuit by first generating parity for the masked bits $D_1$–$D_3$ and $D_{19}$–$D_{26}$ and then comparing the parity bit thus generated with the parity bit for the full word, that is, the 28 bit word. The circuit of FIG. 6 is the one which generates the parity bit for the masked word. The circuit of FIG. 7, which is discussed later, is the one which generates the parity bit for the remainder of the word.

Before discussing FIG. 6, it should be recalled that the O and E bits produced in the first level of logic as shown in part in FIG. 2 each correspond to an octal character, that is, three bits. Also, the B bits equal the D bits when data is present. For example, the digits $O_1$ and $E_1$ correspond to the octal characters $B_1$, $B_2$, $B_3$ and $A_1$, $A_2$, $A_3$. When $O=1$ and $E=0$, there are an odd number of "ones" in the B character (and in the corresponding D character). When $O=0$ and $E=1$, there are an even number of "ones" in the B octal character. Accordingly, E may be considered the parity bit (odd parity is assumed) for the B octal character.

In like manner, the F and G bits produced in the parity system already described each correspond to three O digits and three E digits, respectively. In other words, G, for example, may correspond to the parity bit for the nine B bits and F to nine A bits. When $G=0$ and $F=1$, there are an odd number of "ones" in the nine B digits represented. Similarly, when $G=1$ and $F=0$, there are an even number of "ones" in the nine B bits represented.

The circuit of FIG. 6 includes two inverters 105 and 106 which receive $O_1$ and $E_1$, respectively. The O and E bits arrive from the parity system through gates which are shown later. Inverter 105 applies its output to "none" gates 107 and 110. Inverter 106 applies its output to "none" gates 108 and 109. The inputs $G_3$ and $F_3$ are also applied to the gates. $G_3$ is the second input to "none" gates 107 and 109 and $F_3$ is the second input to "none" gates 108 and 110. The F and G inputs are applied through gates which are discussed later.

As already mentioned, the input $E_1$ represents the number of "ones" in the three bits $B_1$ and $B_2$ and $B_3$ which it is desired to mask. Similarly, the input G represents the nine bits $B_{19}-B_{27}$ it is desired to mask. The circuit of FIG. 6 operates on the principle that an odd number of "ones" plus an odd number of "ones" is equal to an even number of "ones"; an even number of "ones" plus an even number of "ones" is equal to an even number of "ones"; and an odd number of "ones" plus an even number of "ones" is equal to an odd number of "ones." On this basis, the correct parity bit ME and its complement MO are generated for the twelve bits which are masked. The table below succinctly describes the circuit operation. It may be seen that ME remains "zero" when the total number of "ones" in the masked 12 bits are odd and ME becomes "one" when the total number of "ones" in the 12 bits masked are even. ME is, therefore, the parity bit for the masked B (or D) word.

an input ME from the circuit of FIG. 6; and the third receives an input MO from the circuit of FIG. 6. Inverters 114 and 115 apply their output to "none" gates 111 and 112, respectively. Inverter 113 applies its output to "none" gates 111 and 112. The parity bits $A_p$ and $B_p$ from the inverters of FIG. 1 are applied as inputs to the "none" gates 111 and 112, respectively.

When the parity of the full word is correct, $PC=1$ and the output of inverter 113 enables gates 111 and 112. If the parity is incorrect, $PC=0$ and "none" gates 111 and 112 are both disabled. This is to prevent a parity bit $G_p$ from being generated when the original word (the 28 bit word) has incorrect parity.

When there are an even number of "ones" in the 12 bit masked word $D_1-D_3$ and $D_{19}-D_{27}$, $ME=1$ and $MO=0$. When there are an odd number of "ones" in the 12 masked bits, $ME=0$ and $MO=1$. When there are an even number of "ones" in the full word, $I_{28}=0$, $D_{28}=1$, $B_p=1$ and $A_p=0$. When there are an odd number of "ones" in the full word, $D_{28}=0$, $I_{28}=1$, $B_p=0$ and $A_p=1$. The circuit of FIG. 7 compares the A, B, ME and MO digits above. When $B_p$ represents an odd number of "ones" and ME an even number of "ones" in the D word, or when $B_p$ represents an even number of "ones" and ME an odd number of "ones," the parity bit $G_p$ for the remainder word $D_4-D_{18}$ is "zero." At other times, one of the "none" gates 111 and 112 conducts and $G_p=1$. The circuit operation is succinctly given in the table below. This table assumes that the parity of the full word is correct, that is, $PC=1$.

| ME | MO | No. of "ones" in 12 bit masked D word $D_1-D_3$, $D_{19}-D_{27}$ | $B_p$ | $A_p$ | No. of "ones" in full D word $D_1-D_{27}$ | No. of "ones" in remainder word $D_4-D_{18}$ | Conducting Gate | $G_p$ |
|---|---|---|---|---|---|---|---|---|
| 1 | 0 | Even | 1 | 0 | Even | Even | 111 | 1 |
| 0 | 1 | Odd  | 0 | 1 | Odd  | Even | 112 | 1 |
| 1 | 0 | Even | 0 | 1 | Odd  | Odd  | ------- | 0 |
| 0 | 1 | Od   | 1 | 0 | Even | Odd  | ------- | 0 |

*Figure 8*

The complete parity check portion of the system is shown in FIG. 8. The various blocks making up the system have already been described in detail and are

| $O_1$ | $E_1$ | No. of "ones" in 3 bits $D_1-D_3$ | $G_3$ | $F_3$ | No. of "ones" in 9 bits $D_{19}-D_{27}$ | No. of "ones" in 12 bits $(D_1-D_3)+(D_{19}-D_{27})$ | Conducting Gate | ME | MO |
|---|---|---|---|---|---|---|---|---|---|
| 0 | 1 | Even | 0 | 1 | Odd  | Odd  | 109 | 0 | 1 |
| 1 | 0 | Odd  | 0 | 1 | Odd  | Even | 107 | 1 | 0 |
| 0 | 1 | Even | 1 | 0 | Even | Even | 108 | 1 | 0 |
| 1 | 0 | Odd  | 1 | 0 | Even | Odd  | 110 | 0 | 1 |

*Circuit for Generating Parity for Partial Word*

There are inputs to the circuit of FIG. 7 which represent the number of "ones" in the full word and the number of "ones" in the masked word. This circuit operates on the principle that when there are an even number of "ones" in the full word and an even number of "ones" in the masked word, there are an even number of "ones" in the remainder word; when there are an odd number of "ones" in the full word and an odd number of "ones" in the masked word, there are an even number of "ones" in the remainder word; when there are an odd number of "ones" in the full word and an even number of "ones" in the masked word, there are an odd number of "ones" in the remainder word; and when there are an even number of "ones" in the full word and an odd number of "ones" in the masked word, there are an odd number of "ones" in the remainder word.

The circuit of FIG. 7 includes three inverters 113, 114 and 115. The first receives an input PC from the parity check circuit shown in FIG. 5; the second receives numbered similarly to the same blocks in the previous figures. The various leads in FIG. 8 sometimes represent a single wire and sometimes several wires. For example, the first lead at the upper left labeled "$A_1-A_3$" represents three conductors and the second lead from the left labeled "$B_1-B_3$" represents three conductors.

When no information is present, all of the A's and all of the B's equal "one." All of the O's and E's equal "zero." All of the F's and G's equal "one." H and L equal "zero" and PC and PU equal "zero."

The function of the inverters (FIG. 1) from which the A and B bits are derived is to determine whether or not information is present. If information is present, the A and B bits are complementary and one gate in each net conducts. When a D bit is absent, the A and B bits corresponding to that D bit remain "one." All gates in the net to which these A and B bits are directed are cut-off.

The function of logic nets 12–20 in the first level of logic is to examine the input digits and their complements an octal character at a time, that is, three digits at a time, and to produce an output indicating whether there are an odd or an even number of "ones" in the three digits examined. When the three D bits examined have an even number of "ones," E becomes "one" and O remains "zero."

The purpose of nets 21–23 in the second level of logic is to examine the O digits (and their complements the E digits) three at a time to determine whether there are an odd or an even number of "ones" in the three E digits. When there are an even number of "ones" in the three E digits examined, F remains "one," G becomes "zero."

The purpose of logic net 24 in the third level of logic is to examine the three F digits (and their complements the three G digits) to determine when there is an odd or an even number of "ones" in the three G digits. When there is an even number of "ones" in the three F digits, L becomes "one" and H remains "zero."

The purpose of the parity stage 25 is to compare the parity bits $A_p$ and $B_p$ with the bits H and L to determine first, whether all information has reached the parity stage and second, whether parity is correct.

The parity check circuit of FIG. 8 operates in an asynchronous fashion. In other words, the first A and complementary B digits may reach the nets in the first level of logic at different times. Each net waits until three digits and their complements arrive and then passes an output to a net in the second level of logic. In the same manner, the nets in the second level of logic wait until all information signals reach these nets before they pass information to the third level of logic.

An important advantage of the system is that it is capable of high speed operation even though incoming information arrives at different times and the various logic nets may have different inherent delays. This can be shown by the following example. Assume that the quickest piece of information reaches a logic net in the first level of logic in 0.2 microsecond and the slowest piece of information reaches the logic net in the first level of logic in two microseconds. Assume also that the fastest one of the nets imparts a delay of only 0.2 of a microsecond and the slowest a delay of two microseconds. If the circuit were a synchronous circuit, it would be necessary to design everything for the worst case condition, that is, a slow piece of information—one that requires two microseconds to reach a net and a slow net—one that imparts a two microsecond delay. In other words, at least four microseconds would have to be allowed between the time a piece of information started toward the first level of logic and could be passed on to the second level of logic. Moreover, some tolerance would have to be allowed to permit variations in the various delays so that six or eight microseconds would be the minimum time which would have to be allotted.

In the circuit of the present invention, the average speed of operation under the conditions assumed above would be closer to two microseconds than to six or eight microseconds on a statistical basis. In the worst possible case, a slow signal arrives at a slow stage giving the maximum delay of four microseconds. No tolerance is needed since each stage operates independently and no stage passes information on to the next stage until it completes its logic operation. In the average case, an average signal such as one delayed a microsecond or less reaches a stage operating at an average speed such as one microsecond or so giving a total delay of two microseconds. In another usual case, on a statistical basis, a fast signal, such as one delayed only 0.2 of a microsecond, reaches a slow stage, such as one operating in two microseconds, giving a total delay of slightly more than two microseconds. In another case, a slow signal, such as one delayed two microseconds, reaches a fast stage, such as one operating at 0.2 of a microsecond, again giving a total delay of slightly more than two microseconds.

Another important advantage of the circuit is that aging of components or other changing circuit parameters which may change the delay produced by individual ones of the logic nets do not make the circuit inoperative. They merely slow the stage down somewhat. For example, suppose that logic net 5 changes the delay it introduces from one to three microseconds. The circuit continues to operate perfectly, however, in the worst case the delay introduced by this stage would be three microseconds, its delay plus two microseconds, the time required for the slowest signal to reach this stage.

Another advantage of this circuit is that lack of information is not mistaken for information. For example, suppose that binary bit $A_7$ does not arrive at logic net 14. This means that $A_7$ and $B_7$ are both "one," whereby no stage in net 14 conducts. This means $O_3$ and $E_3$ remain "zero." $F_1$ and $G_1$, therefore, both remain "one," H and L both remain "zero," and PC and PU both remain "zero." This means that a piece of information has not reached the parity stage 25.

Complete Parity System

The overall parity system including means for checking the parity of a full word means for masking a portion of the word and means for generating parity for the remainder of the word is shown in block form in FIG. 12. Most of the figure is self-explanatory and the legends in the blocks indicate the other figures which show the details of the blocks. However, blocks 120–125 have not yet been considered.

Block 121 consists of a group of gates which may be "none" gates or "and" gates. The purpose of the gates is to pass certain of the E and O digits to the stage which generates parity for the masked bits. Block 122 represents another group of gates having a function similar as that of gates 121 but which pass digits indicative of nine bits to the parity generation stage for the masked bits. These two stages are described in detail shortly.

In the example chosen for illustration, 12 bits of the word are masked. It is to be understood that the invention is not limited to the masking of this number of bits. For example, it is possible to mask any number of bits singly or in multiples of three or in multiples of any other digit. In order to mask the single bits, a gate stage would be required at the output of the inverters illustrated at block 126. If it is desired to mask, for example, six bits, two of the gates in block 121 will be enabled and all of the gates 122 disabled by control voltages supplied by the mask generator. Switches are required to place one set of O, E bits on the wire 150.

Slight redesign of the logic in the parity generation stage 127 is required in the event that there are more than a total of four inputs to this stage. Such redesign is for the purpose of converting the more than four inputs to four inputs. For example, in the event that there are inputs $O_1$, $E_1$, $F_2$, $G_2$, $F_3$ and $G_3$, it is necessary to combine $F_2$ with $F_3$ and $G_2$ with $G_3$ to obtain $F_x$, $G_x$. These indicate the number of "ones" in the 18 bits represented by $F_2$ and $F_3$. $F_x$ and $G_x$ would be applied to lead 150. The circuit for obtaining $F_x$ and $G_x$ may be similar to the circuit of FIG. 6.

If there are only four inputs to stage 127 such as, for example, $O_1$ and $E_1$ and $O_2$ and $E_2$, then $O_1$ and $E_1$ are applied to the same place in the circuit as shown in FIG. 6. $O_2$ and $E_2$ are applied to the terminals in the circuit at which $G_3$ and $F_3$ are presently applied.

The purpose of the gates 125 is to pass the portion not masked of the full word to the gates 123. These gates may be "nor" gates or "and" gates and one embodiment of such gates is shown in FIG. 9.

The purpose of gates 123 is to pass the partial word, $D_4$–$D_{18}$ in the example chosen for illustration, and the parity bit $G_p$ generated for that partial word to the partial word register 124. These gates and the partial word register are shown in FIG. 9.

*Partial Word Register and Gates Associated With the Partial Word Register*

The gates 125 connected between the word bus 1 and the gates 123 are illustrated in FIG. 9 as "and" gates. There are a total of 27 "and" gates in block 125, one for each digit of the word. However, in the interest of drawing simplicity, only two such gates 130 and 131 are illustrated. The remainder of the gates are schematically implied by the dashed line. Each of the gates is connected to a different one of 27 conductors of the word bus. The 28th conductor, which carries the parity bit for the full word, is not connected to any gate as the parity for the partial word it is desired to pass is not necessarily the same as the parity of the full word.

In operation, the particular ones of the gates 125 it is desired to enable receive an enabling signal ROPW (Read Out Partial Word) from the mask generator 120 (Fig. 12). The mask generator is conventional and may be part of the control unit of the computer. It is commanded to transmit the ROPW signals by machine instruction signals. The ROPW signals determine the makeup (the bits in) the partial word sent to a particular partial word register.

Gates 123, shown as "and" gates in FIG. 9, receive the outputs of gates 125. There are a number of gates in this stage equal to the number of flip-flops in the partial word register. The particular word register 124 shown as 17 flip-flops, 16 for data bits and the 17th for the parity bit. For the purpose of drawing simplicity, only three of the gates 132–134 and three of the flip-flops 135–137 are shown.

When it is desired to read in the partial word and the parity digit for the partial word, a control signal RIPW (Read In Partial Word) is applied to all of the gates 123. This control signal arrives from the central control area of the computer and is a machine instruction signal. Alternatively, the control signal may, if desired, be the PC signal which indicates that the parity check of the full word has been completed and that parity of the full word is correct.

*Gates Associated With Mask Generator*

There are a total of 18 "and" gates in block 121, FIG. 10, nine for the O bits and nine for the E bits. Four of the gates 138–141 are illustrated by way of example. These gates are enabled by signals supplied from the mask generator 120. In the example illustrated, $MA_1$ is made "one," thereby enabling gates 138 and 140. $MA_2$–$MA_9$ remain "zero" thereby keeping the remaining gates disabled.

There are a total of six "none" gates 142–147 in block 122 shown in FIG. 11. Each of the gates receives a different F or G signal. A signal MAS=0 from the mask generator is employed to enable the gates, as desired. In the example chosen for illustration, $MAS_3$ is made equal to "zero" and $MAS_1$ and $MAS_2$ are left "one." Thus, the $F_3$ and $G_3$ signals are applied through enabled gates 146 and 147 to the parity generator stage 127. The remaining gates are kept disabled.

What is claimed is:

1. In a parity circuit, means responsive to the presence of all binary digits in a word for producing an indication of an odd or even number of "ones" in the word; means in said circuit responsive to the absence of one or more of the binary digits in said word for preventing the production of said indication; and means in said circuit for generating parity for a group, less than all, of the binary digits in said word.

2. In a parity circuit, means responsive to the presence of all binary digits in a word for producing an indication of an odd or even number of "ones" in the word; and means responsive to said indication and receptive of digits indicative of a group, less than all, of said digits for generating a parity digit for said group of digits.

3. In a parity circuit, means for checking the parity of a word for producing an indication when said parity is correct; and means responsive to said indication for generating parity for a portion less than all of said word.

4. In a parity circuit, means for checking the parity of a word for producing an indication when said parity is correct; means responsive to said indication for generating parity for a portion less than all of said word; and means for preventing the production of said indication when a digit in said word is missing.

5. The combination in a digital computer of, a bus along which a word is transmitted; and a circuit connected to said bus for checking the parity of said word and producing an indication when parity is correct, masking a portion of said word, and, in response to said indication, generating parity of the remainder of the word.

6. In a circuit which receives a word and the parity bit of the word, in combination, means for generating a parity bit for one portion of the word; and means responsive to said generated parity bit and the first mentioned parity bit for generating a parity bit for the remaining portion of said word.

7. In combination, a first circuit for examining the data binary digits in a word, a group at a time, for obtaining a smaller number of second digits, each indicative of the number of "ones" in the group of digits examined; another circuit for examining the smaller number of second digits, a group at a time, for obtaining a still smaller number of third digits, each indicative of the number of "ones" in the group of second digits examined; circuit means responsive to the third group of digits and to the parity digit of the word for indicating whether or not the parity of the word is correct; and a circuit responsive to the indication of parity and to at least one of the second and third digits, for generating parity for a group, less than all, of the digits in said word.

8. In combination, a first circuit for examining the data binary digits in a word, a group at a time, for obtaining a smaller number of second digits, each indicative of the number of "ones" in the group of digits examined; another circuit for examining the smaller number of second digits, a group at a time for obtaining a still smaller number of digits, each indicative of the number of "ones" in the group of digits examined; other circuit means for continuing the process above until a single digit is obtained which is indicative of the number of "ones" in the word; circuit means responsive to said single digit and to the parity digit of the word for indicating whether or not the parity of the word is correct; and a circuit responsive to the indication of parity and to a digit indicative of parity of one group, less than all, of the digits in said word, for generating parity for the remaining group, less than all, of the digits in said word.

9. In a circuit in which a word is transmitted along one bus and the complement of the word is transmitted along another bus, and in which a binary bit of given value in the word and the absence of a binary bit in the word are both represented by the same voltage; a plurality of "none" gates, each for receiving a different combination of word and complement bits; and a plurality of logical inverters, one for each conductor of the two buses, connecting the two buses to the "none" gates, whereby when a bit in a word is absent, the "none" gates to which that bit is applied are inhibited, and the "none" gates to which the conductor which normally carries the complement of that bit is connected, are inhibited.

10. In a combined parity check-parity generator circuit, means for producing a signal indicative of correct parity; means for generating parity; and an inhibit circuit responsive to the absence of said signal indicative of correct parity for inhibiting said means for generating parity.

11. In a parity circuit, means for producing indications of the parity of groups, less than all, of the bits in a word; means responsive to said indications and to a parity bit for producing a parity indication; and means responsive to said last-named parity indication and the parity indication for one group of bits in the word for generating parity for the remaining bits in the word.

References Cited in the file of this patent

UNITED STATES PATENTS

| | | |
|---|---|---|
| Re. 23,601 | Hamming et al. | Dec. 23, 1952 |
| 2,848,607 | Maron | Aug. 19, 1958 |
| 2,906,997 | Rabin et al. | Sept. 29, 1959 |